United States Patent
Legranger et al.

(10) Patent No.: US 11,539,250 B2
(45) Date of Patent: Dec. 27, 2022

(54) ROTARY ELECTRICAL MACHINE WITH A DIVIDED WINDING

(71) Applicant: Valeo Equipements Electriques Moteur, Creteil (FR)

(72) Inventors: Jérome Legranger, Creteil (FR); Philippe-Siad Farah, Creteil (FR); Radu Fratila, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 141 days.

(21) Appl. No.: 16/978,473

(22) PCT Filed: Feb. 27, 2019

(86) PCT No.: PCT/EP2019/054789
§ 371 (c)(1),
(2) Date: Sep. 4, 2020

(87) PCT Pub. No.: WO2019/170482
PCT Pub. Date: Sep. 12, 2019

(65) Prior Publication Data
US 2021/0099035 A1    Apr. 1, 2021

(30) Foreign Application Priority Data
Mar. 5, 2018    (FR) ...................... 1851886

(51) Int. Cl.
*H02K 1/16*    (2006.01)
*H02K 7/00*    (2006.01)
*H02K 19/10*    (2006.01)

(52) U.S. Cl.
CPC .............. *H02K 1/16* (2013.01); *H02K 7/006* (2013.01); *H02K 19/10* (2013.01)

(58) Field of Classification Search
CPC ............ H02K 1/16; H02K 19/10; H02K 3/12; H02K 3/28; H02K 7/006
See application file for complete search history.

(56) References Cited

U.S. PATENT DOCUMENTS

| | | | | |
|---|---|---|---|---|
| 4,550,267 A | * | 10/1985 | Vaidya ................... | H02K 21/12 310/112 |
| 7,005,772 B1 | * | 2/2006 | Frederick ................ | H02K 3/28 310/179 |
| 2018/0358874 A1 | * | 12/2018 | Otsu ...................... | H02K 17/14 |

FOREIGN PATENT DOCUMENTS

| | | | | |
|---|---|---|---|---|
| DE | 3202958 A1 | 8/1983 | | |
| DE | 102016105549 A1 | * | 9/2016 | ............. H02K 1/165 |

(Continued)

OTHER PUBLICATIONS

International Search Report and Written Opinion corresponding to International Application No. PCT/EP2019/054789, dated May 20, 2019 (15 pages).

*Primary Examiner* — Naishadh N Desai
(74) *Attorney, Agent, or Firm* — Osha Bergman Watanabe & Burton LLP

(57) ABSTRACT

The invention predominantly relates to a rotating electrical machine for a motor vehicle, comprising: a rotor having an even number of pole pairs Np; and a stator (10) comprising a body provided with slots and a three-phase winding (14) inserted into the slots in the stator body. The three-phase winding (14) comprises: at least a first group (G1) of portions of phases (U, V, W) and a second group (G2) of portions of phases (U, V, W) which are associated with a first set of at least three bridge arms (21.1); and at least a third group (G3) of portions of phases (U, V, W) and a fourth group (G4) of portions of phases (U, V, W) which are associated with a second set of at least three bridge arms (21.1).

16 Claims, 4 Drawing Sheets

(56) References Cited

FOREIGN PATENT DOCUMENTS

| | | | |
|---|---|---|---|
| DE | 102016105549 A1 | 9/2016 | |
| DE | 102016111212 A1 * | 12/2016 | ............ H02K 1/165 |
| DE | 102016111212 A1 | 12/2016 | |
| EP | 0229018 A2 * | 8/1986 | |
| KR | 101365469 B1 * | 10/2012 | |

* cited by examiner

ROTARY ELECTRICAL MACHINE WITH A DIVIDED WINDING

The present invention relates to a rotary electrical machine. The invention has a particularly advantageous application with low-voltage electrical machines, i.e. with electrical machines which operate at a voltage lower than 60 V. The electrical machine is designed to be used in a motor vehicle, in particular of the hybrid type.

In a known manner, rotary electrical machines comprise a stator and a rotor integral with a shaft. The rotor can be integral with a driving and/or driven shaft, and can belong to a rotary electrical machine in the form of an alternator, an electric motor or a reversible machine which can operate in both modes.

The rotor comprises a body formed by a stack of metal plate sheets which are retained in the form of a set by means of an appropriate securing system. The rotor comprises poles formed for example by permanent magnets which are accommodated in cavities provided in the body.

The stator is fitted in a housing which is configured to rotate the shaft by means of roller bearings. The stator comprises a body provided with a plurality of teeth defining notches, and a winding inserted in the notches of the stator. The winding is obtained for example from a continuous wires covered with enamel, or from conductive elements in the form of pins which are connected to one another by welding. Alternatively, the phases of the machine are formed from individual coils which are each wound around a stator tooth.

In order to ensure the control of the rotary electrical machine, a control module, which interacts with the engine computer, controls the passage of the current into the interior of bridge arms which are connected to the different phases of the machine. These bridge arms incorporate rectifier elements which are generally in the form of MOS transistors. The bridge arms are controlled in particular according to the temperature of the stator, the position and the speed of the rotor, as well as operating parameters of the thermal engine which are provided by the engine computer. The bridge arms can operate in inverter mode or in voltage rectifier mode.

Conventionally, the power of a low-voltage electrical machine which is supplied by the battery of a motor vehicle is approximately 15 kW to 30 kW. In order to increase this power, it is known to resize the bridge arms in order to be able to withstand the increase in the intensity of the current circulating in the machine. However, this poses problems of costs associated with the development of specific modules, as well as problems of integration of the electronic block because of the large size of the modules.

The objective of the invention is to eliminate these disadvantages efficiently by proposing a rotary electrical machine for a motor vehicle, characterised in that it comprises:
- a rotor with an even number of pairs of poles;
- a stator comprising a body provided with notches and a three-phase winding inserted in the said notches of the stator body, the said three-phase winding comprising:
  - at least one first group of portions of phases and one second group of portions of phases associated with a first assembly of at least three bridge arms; and
  - at least one third group of portions of phases and one fourth group of portions of phases associated with a second assembly of at least three bridge arms.

By using two inverters instead of a single one, and by dividing the winding into a plurality of groups of portions of phases, the invention thus makes it possible to facilitate the integration of the system by permitting the use of standard bridge arms. In addition, this facilitates the production and maintenance of the electrical machine. The invention also limits the magnetic losses and the acoustic noise, whilst minimising the torque undulations of the electrical machine, without needing to modify the configuration of the rotor because of the low presence of harmonics. The invention also makes it possible to provide a compact electrical machine.

According to one embodiment, each group of portions of phases comprises in at least one single notch two conductors belonging to different phases.

According to one embodiment, each group of portions of phases comprises at least two conductors belonging to a single phase in at least two adjacent notches.

According to one embodiment, the number of notches per pole and per phase is strictly greater than 1 and equal to, or less than, 3.

According to one embodiment, the number of notches per pole and per phase is equal to 2.5.

According to one embodiment, around a circumference of the stator, there is alternation between a group of portions of phases of the first assembly of bridge arms and a group of portions of phases of the second assembly of bridge arms.

According to one embodiment, for a three-phase stator comprising four groups of portions of phases, the groups of portions of phases associated with a single assembly of bridge arms are diametrically opposite one another.

According to one embodiment, the rotor comprises a number of pairs of poles selected from amongst: 4, 6, 8, 10 or 12.

According to one embodiment, the winding is of the type with pins comprising a cross-section with a substantially rectangular form. "Substantially" means the fact that the rectangle can have rounded corners in order to avoid damaging the wires during the insertion in the notches of the stator.

According to one embodiment, the rotor is a rotor with permanent magnets, a wound rotor, or a mixed rotor.

According to one embodiment, the said rotary electrical machine has an operating voltage lower than 60 V.

The invention will be better understood by reading the following description and examining the figures which accompany it. These figures are provided purely by way of illustration and in no way limit the invention.

The elements which are identical, similar or analogous retain the same reference from one figure to another.

Figure 1:
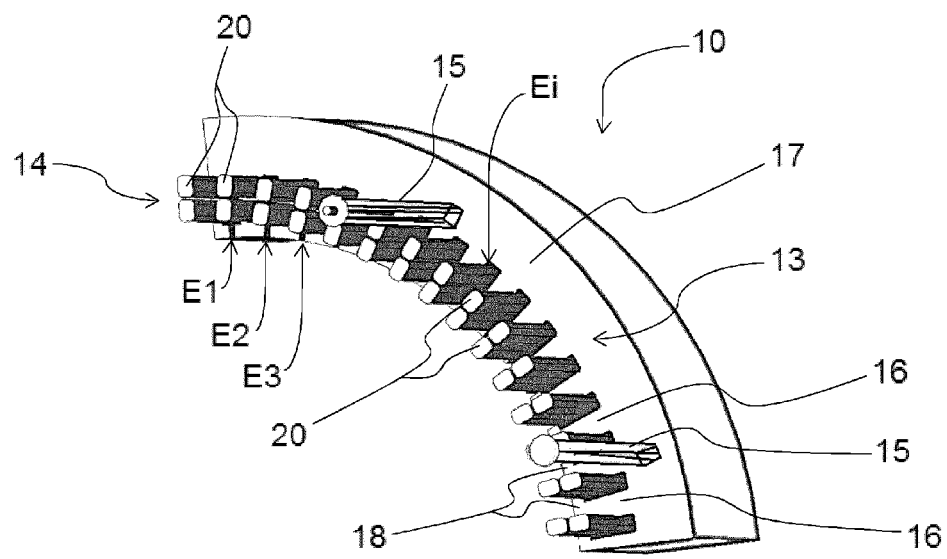
FIG. 1 shows a partial view in perspective of a quarter of a stator used in a rotary electrical machine according to the present invention.

FIG. 1 shows a portion of wound stator 10 of a rotary electrical machine according to the invention. The stator 10 is designed to surround a rotor 11 shown in FIG. 7, with the presence of an air gap between the outer periphery of the rotor 11 and the inner periphery of the stator 10. The rotor 11 comprises an even number of pairs of poles. The number of pairs of poles is advantageously selected from amongst: 4, 6, 8, 10 or 12.

The stator 10 is designed to be secured on a housing (not represented) which is configured to rotate the shaft of the rotor 11 via ball bearings and/or needle bearings. Advantageously, the rotary electrical machine is of the synchronous type, and has power of between 25 and 30 kW.

More specifically, the stator 10 comprises a body 13 and a polyphase winding 14, which in particular is three-phase, inserted in the interior of notches Ei of the body 13. The stator body 13 consists of an axial stack of flat metal plates retained together by means of an appropriate securing system, comprising for example rivets 15. The stator body 13 comprises teeth 16 which are distributed angularly regularly around an inner periphery of a yoke 17. These teeth 16 delimit the notches Ei (i being a whole number), such that each notch Ei is delimited by two successive teeth 16. The notches Ei open axially into the axial end faces of the stator body 13. The notches Ei are also open radially towards the interior of the stator body 13. The stator 10 can be provided with tooth roots 18 on the side of the free ends of the teeth 16. Each tooth root 18 extends circumferentially on both sides of a corresponding tooth 16.

In the example represented, the winding 14 is made of conductors 20 constituted by pins which are globally in the form of a "U". Generally, axial branches of conductors 20 are inserted in the interior of the notches Ei. The radial stacking of the branches in the interior of the notches Ei comprises an outer layer of conductors 20 and an inner layer of conductors 20. In other words, the stator 10 comprises two conductors 20 per notch Ei. The free ends of the conductors 20 are connected electrically to one another, in particular by welding, in particular of the laser type. In this case, the conductors 20 have a cross-section with a substantially rectangular form in order to optimise the filling of the notches, but as a variant they could have a cross-section with a round form.

As a variant, the winding 14 could be obtained from continuous conductive wires forming undulations in the interior of the notches of the stator 10. In all cases, the conductors 20 are advantageously made of copper covered with a layer of enamel, or optionally aluminium.

Figure 2:
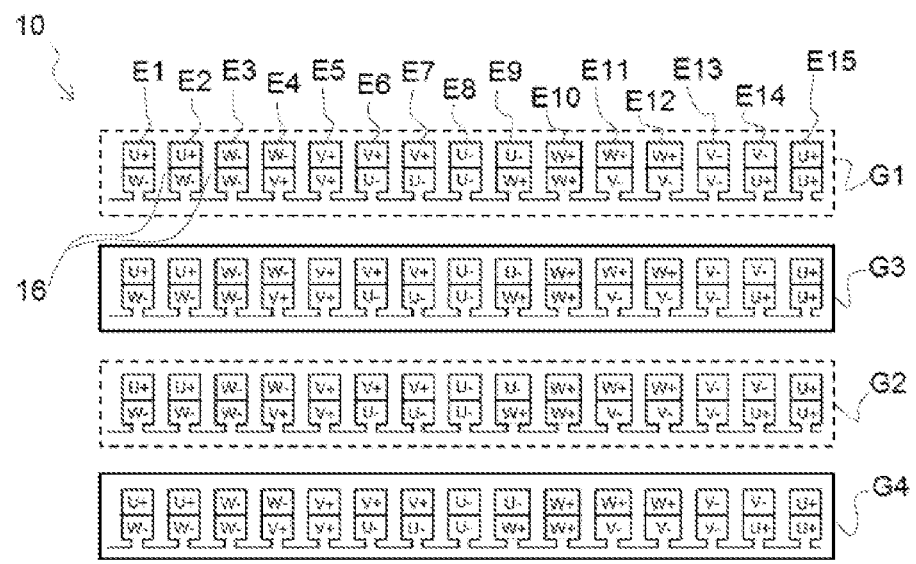
FIG. 2 is a schematic representation of the different groups of portions of phases of the divided three-phase winding according to the present invention.
Figure 3:
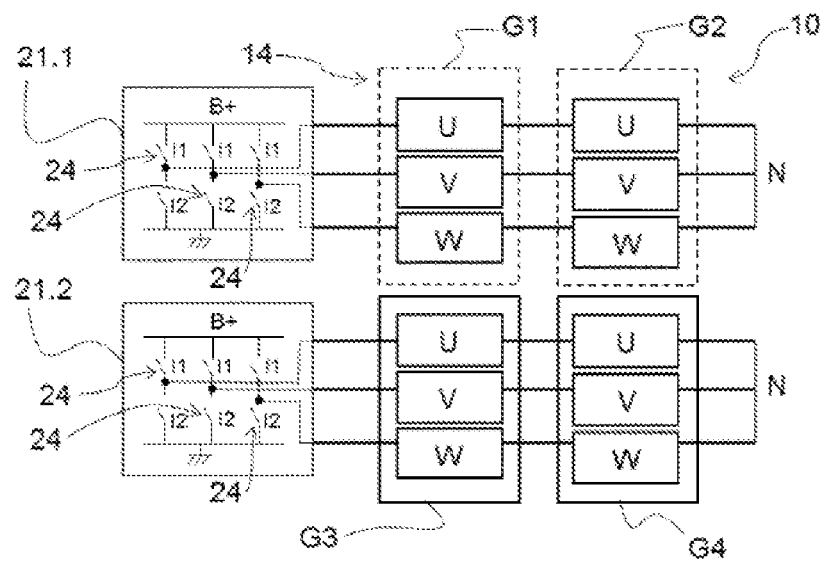
FIG. 3 is a schematic representation of the connection of the different groups of portions of phases of the winding according to the invention with two assemblies of corresponding bridge arms.

As can be seen in FIGS. 2 and 3, the winding 14 advantageously comprises three phases U, V, W which are fragmented into a plurality of groups G1, G2, G3, G4 of portions of phases associated with two distinct assemblies of bridge arms 21.1 and 21.2. In FIG. 2, the term "+" corresponds to the input of the current and the term "−" corresponds to the output of the current in the phases.

Each assembly 21.1, 21.2 comprises in a conventional manner three bridge arms 24, i.e. one bridge arm 24 per phase. A bridge arm is formed by two controlled switches I1 and I2 in order to connect the corresponding phase U, V, W selectively to the positive supply potential B+ of the machine or to the ground. The bridge arms 24 which are connected to the phases are controlled by a control module.

Each switch I1, I2 can be constituted by a power transistor, for example of the MOS type, which is preferably associated with a free-wheel diode.

Advantageously, as shown in FIG. 3, a first group G1 of portions of phases U, V, W and a second group G2 of portions of phases U, V, W are associated with the assembly 21.1. A third group G3 of portions of phases U, V, W and a fourth group G4 of portions of phases U, V, W are associated with the assembly 21.2. A portion of phase corresponds to a part of the winding of a given phase U, V, W extending around part of the circumference of the stator body 13.

In this case, for the groups G1 and G2 which are connected to the first assembly of bridge arms 21.1, the portion of the phase U of the first group G1 is connected in series to the portion of the phase U of the second group G2. The portion of the phase V of the first group G1 is connected in series to the portion of the phase V of the second group G2. The portion of the phase W of the first group G1 is connected in series to the portion of the phase W of the second group G2.

For the groups G3 and G4 which are connected to the second assembly of bridge arms 21.2, the portion of the phase U of the third group G3 is connected in series to the portion of the phase U of the fourth group G4. The portion of the phase V of the third group G3 is connected in series to the portion of the phase V of the fourth group G4. The portion of the phase W of the third group G3 is connected in series to the portion of the phase W of the fourth group G4.

The phases U, V, W are advantageously coupled in the form of a star. The neutral points N of the two assemblies of bridge arms 21.1, 21.2 are preferably separated in order to avoid any recirculation of harmonics between the two assemblies 21.1, 21.2. As a variant, the neutral points N could however be combined.

As can be seen in FIG. 2, each group G1, G2, G3, G4 of portions of phases U, V, W comprises, in at least a single notch Ei, two conductors 20 belonging to different phases. Thus, in each group G1, G2, G3, G4, the notches E1, E2 and E9 contain conductors 20 which are associated respectively with the phase U and with the phase W; the notches E4, E11 and E12 contain conductors 20 which are associated respectively with the phase V and with the phase W; the notches E6, E7 and E14 contain conductors 20 which are associated respectively with the phase U and with the phase V In addition, each group G1, G2, G3, G4 of portions of phases U, V, W comprises at least two conductors 20 belonging to a single phase in at least two adjacent notches, i.e. two notches Ei which are disposed next to one another and are separated by a common tooth 16

In the example represented, conductors 20 which are associated with the phase U are thus disposed in the notches E1, E2, E6, E7, E8, E9 and E15. Conductors 20 which are associated with the phase V are disposed in the notches E4, E5, E6, E7 and E11, E12, E13, E14. Conductors 20 which are associated with the phase W are disposed in the notches E1, E2, E3, E4, E9, E10, E11 and E12.

Figure 6:
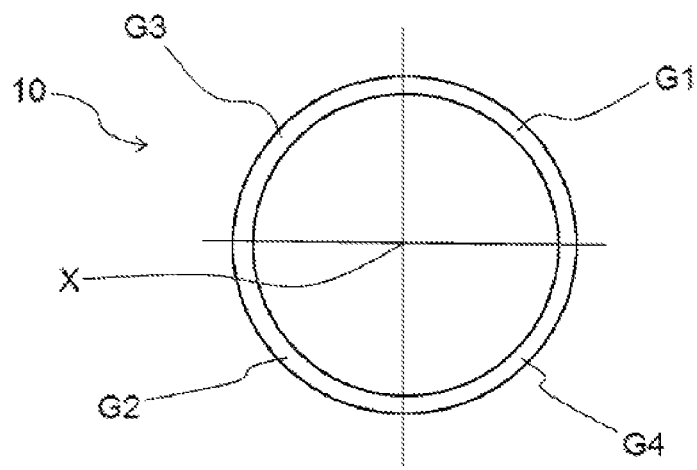
FIG. 6 illustrates the arrangement around a circumference of the stator of the groups of portions of phases associated with two distinct assemblies of bridge arms.

Around a circumference of the stator 10, there is alternation between a group of portions of phases of the first assembly of bridge arms 21.1, and a group of portions of phases of the second assembly of bridge arms 21.2. Thus, as can be seen in FIG. 6, for a three-phase stator 10 comprising four groups G1, G2; G3, G4 of portions of phases, the groups of portions of phases which are associated with a single assembly of bridge arms 21.1, 21.2 are diametrically opposite one another. The groups of portions of phases G1 and G2 which are associated with the first assembly 21.1 are diametrically opposite one another, and the groups of portions of phases G3 and G4 which are associated with the second assembly 21.2 are diametrically opposite one another.

Advantageously, the number of notches per pole and per phase (parameter known as "spp" for "splot per pole per phase") is strictly greater than 1 and equal to, or less, than 3, and is preferably equal to 2.5.

According to a non-limiting preferred embodiment, the machine comprises a three-phase stator 10 with 60 notches and a polarity of 4 pairs of poles on the rotor 11. The elementary pattern of 15 notches for each group G1, G2, G3 and G4 is repeated 4 times. There is then a configuration of 2.5 notches per pole and per phase. The stator circuits which are supplied by the assemblies of distinct bridge arms 21.1, 21.2 are preferably spaced by a pair of poles.

Figure 4A:
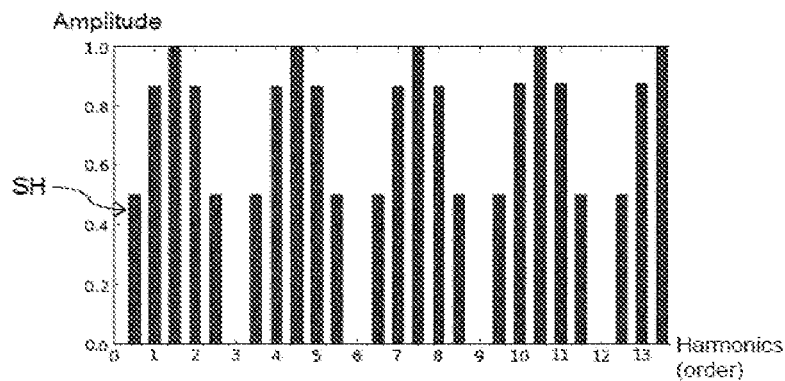
FIGS. 4a and 4b are graphic representations of the level of the harmonics obtained respectively with a winding of a standard concentrated type and a divided three-phase winding according to the invention.
Figure 4B:
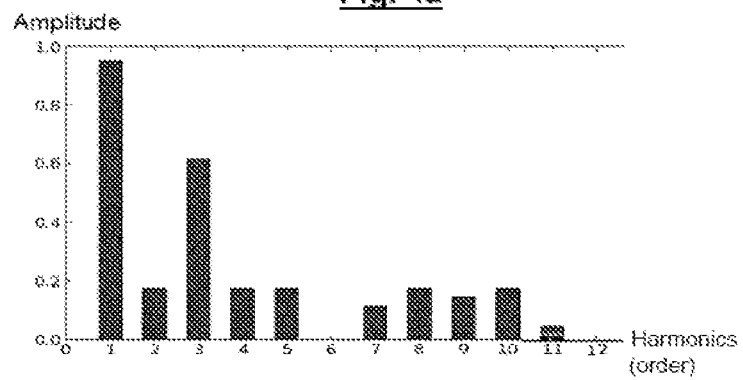

FIG. 4a shows that a conventional stator 10 configuration provided with a concentrated winding, i.e. formed by coils which are wound around teeth 16 of the stator 10, with 4 pairs of poles, and 0.5 notch per pole and per phase, generates a sub-harmonic SH which gives rise to substantial magnetic losses. As shown in FIG. 4b, the configuration according to the invention makes it possible to eliminate the sub-harmonics generated by the winding 14, and to limit the total number of harmonics, as well as their amplitude.

Figure 5:
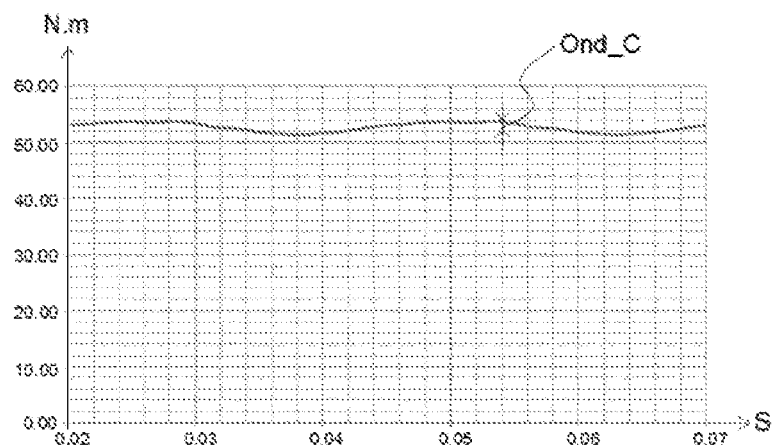
FIG. 5 is a graphic representation of the torque undulations obtained with a rotary electrical machine according to the invention.

In addition, as can be seen in FIG. 5, the torque undulation Ond_C of the electrical machine according to the invention is low. It will be remembered that this undulation is defined by the difference between the maximal torque and the minimal torque divided by the mean torque. This torque undulation Ond_C is equal to 5% or less, without having to modify the configuration of the rotor 11.

The stator 10 can be used with any type of rotor 11, in particular a rotor 11 with permanent magnets, a wound rotor 11, or a mixed rotor 11 comprising poles formed by a coil and at least one associated magnet.

In a known manner, the magnets can be made of ferrite or of rare earth, depending on the applications and the power required from the machine. The rotor 11 can have flux concentration, i.e. the opposite lateral faces of the magnets situated in two consecutive cavities have the same polarity.

Figure 7:
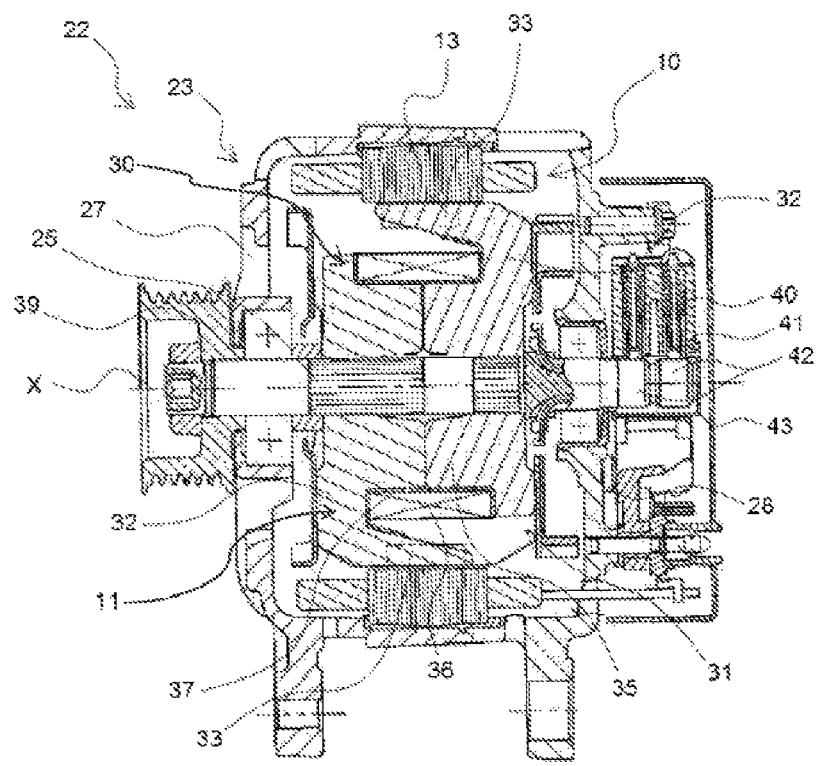
FIG. 7 is a view in longitudinal cross-section of a rotary electrical machine according to the invention.

FIG. 7 represents a non-limiting example of implantation of the stator 10 according to the invention in the interior of a compact polyphase alternator 22, in particular for a motor vehicle. The alternator 22 can transform mechanical energy into electrical energy, and can be reversible. A reversible alternator 22 of this type, known as an alternator-starter, makes it possible to transform electrical energy into mechanical energy, in particular in order to start the thermal engine of the vehicle.

This alternator 22 comprises a housing 23, and, in the interior of the housing, it comprises a rotor 11 with claws fitted on a shaft 25 and the stator 10 which surrounds the rotor 11, whilst being separated from the rotor by an air gap. The axis X along which the shaft 25 extends forms the axis of the electrical machine.

The housing 23 comprises front 27 and rear 28 bearings supporting the stator. The bearings 27, 28 have a hollow form, and they each support centrally a ball bearing for fitting of the shaft 25 with rotation.

More specifically, the rotor 11 comprises two magnet wheels 30, 31 each with a flange 32 with transverse orientation, provided on its outer periphery with claws 33, which for example have a trapezoidal form and axial orientation. The claws 33 of one wheel 30, 31 face axially towards the flange 32 of the other wheel 30, 31. A claw 33 of one magnet wheel 30, 31 thus penetrates into the space which exists between two adjacent claws 33 of the other magnet wheel 30, 31, such that the claws 33 of the magnet wheels 30, 31 are imbricated relative to one another.

A cylindrical core 35 is interposed axially between the flanges 32 of the wheels 30, 31. In this case, the core 35 consists of two half-cores, each belonging to one of the flanges 32. This core 35 supports on its outer periphery an excitation coil 36 which is wound around an insulator 37 interposed radially between the core 35 and the coil 36.

On its front end side, the shaft 25 supports a pulley 39 belonging to a device for transmission of movements to at least one belt or chain, between the alternator 22 and the thermal engine of the motor vehicle.

The rear bearing 28 supports a brush-holder 40 provided with brushes 41 which are designed to rub against rings 42 of a collector 43, in order to ensure the supply of power to the winding of the rotor 11.

The stator 10 can also be incorporated in the interior of other types of electrical machines, in particular those which operate in motor mode only.

It will be appreciated that the foregoing description has been provided purely by way of example, and does not limit the field of the invention, a departure from which would not be constituted by replacing the different elements by any other equivalents.

In addition, the different characteristics, variants and/or embodiments of the present invention can be associated with one another according to different combinations, provided that they are not incompatible or mutually exclusive.

The invention claimed is:

1. A rotary electrical machine for a motor vehicle, comprising:
   a rotor with an even number of pairs of poles;
   a stator comprising a body provided with notches; and
   a three-phase winding inserted in the notches of the stator body,
   the three-phase winding comprising:
   at least one first group of portions of phases and one second group of portions of phases associated with a first assembly of at least three bridge arms, and
   at least one third group of portions of phases and one fourth group of portions of phases associated with a second assembly of at least three bridge arms,
   wherein, around a circumference of the stator, there is alternation between a group of portions of phases of the first assembly of bridge arms and a group of portions of phases of the second assembly of bridge arms.

2. The rotary electrical machine according to claim 1, wherein each group of portions of phases comprises in at least one single notch two conductors belonging to different phases.

3. The rotary electrical machine according to claim 1, wherein each group of portions of phases comprises at least two conductors belonging to a single phase in at least two adjacent notches.

4. The rotary electrical machine according to claim 1, wherein the number of notches per pole and per phase is strictly greater than 1 and equal to, or less than, 3.

5. The rotary electrical machine according to claim 4, wherein the number of notches per pole and per phase is equal to 2.5.

6. The rotary electrical machine according to claim 1, wherein, for a three-phase stator comprising four groups of portions of phases, the groups of portions of phases associated with a single assembly of bridge arms are diametrically opposite one another.

7. The rotary electrical machine according to claim 1, wherein the rotor comprises a number of pairs of poles selected from amongst: 4, 6, 8, 10 or 12.

8. The rotary electrical machine according to claim 1, wherein the winding is of the type with pins comprising a cross-section with a substantially rectangular form.

9. The rotary electrical machine according to claim 1, wherein the rotor is a rotor with permanent magnets, a wound rotor, or a mixed rotor.

10. The rotary electrical machine according to claim 1, wherein the rotary electrical machine has an operating voltage lower than 60 V.

11. The rotary electrical machine according to claim 1, wherein:
- each phase portion of the at least one first group is connected in series with each phase portion of the at least one second group; and
- each phase portion of the at least one third group is connected in series with each phase portion of the fourth group.

12. A rotary electrical machine for a motor vehicle, comprising:
- a rotor with an even number of pairs of poles;
- a stator comprising a body provided with notches; and
- a three-phase winding inserted in the notches of the stator body, the three-phase winding comprising:
- at least one first group of portions of phases and one second group of portions of phases associated with a first assembly of at least three bridge arms, and
- at least one third group of portions of phases and one fourth group of portions of phases associated with a second assembly of at least three bridge arms,
- wherein, for a three-phase stator comprising four groups of portions of phases, the groups of portions of phases associated with a single assembly of bridge arms are diametrically opposite one another.

13. The rotary electrical machine according to claim 12, wherein the rotor comprises a number of pairs of poles selected from amongst: 4, 6, 8, 10 or 12.

14. The rotary electrical machine according to claim 12, wherein the winding is of the type with pins comprising a cross-section with a substantially rectangular form.

15. The rotary electrical machine according to claim 12, wherein the rotor is a rotor with permanent magnets, a wound rotor, or a mixed rotor.

16. The rotary electrical machine according to claim 12, wherein the rotary electrical machine has an operating voltage lower than 60 V.

* * * * *